United States Patent
Liang et al.

(10) Patent No.: US 10,291,718 B2
(45) Date of Patent: May 14, 2019

(54) METHOD AND APPARATUS FOR IMPLEMENTING COMMUNICATION FROM WEB PAGE TO CLIENT

(71) Applicant: GUANGZHOU UCWEB COMPUTER TECHNOLOGY CO., LTD., Guangzhou (CN)

(72) Inventors: Jie Liang, Guangdong (CN); Chuanju Wang, Guangdong (CN); Zhuo Zeng, Guangdong (CN)

(73) Assignee: GUANGZHOU UCWEB COMPUTER TECHNOLOGY CO., LTD., Guangzhou (CN)

( * ) Notice: Subject to any disclaimer, the term of this patent is extended or adjusted under 35 U.S.C. 154(b) by 201 days.

(21) Appl. No.: 14/985,564

(22) Filed: Dec. 31, 2015

(65) Prior Publication Data

US 2016/0191633 A1    Jun. 30, 2016

(30) Foreign Application Priority Data

Dec. 31, 2014    (CN) .......................... 2014 1 0857756

(51) Int. Cl.
*H04L 29/08* (2006.01)
*G06F 8/61* (2018.01)
*H04L 29/06* (2006.01)

(52) U.S. Cl.
CPC .............. *H04L 67/141* (2013.01); *G06F 8/61* (2013.01); *H04L 67/02* (2013.01); *H04L 67/42* (2013.01)

(58) Field of Classification Search
CPC ......... G06F 8/61; H04L 67/02; H04L 67/141; H04L 67/42

USPC ......................................................... 709/203
See application file for complete search history.

(56) References Cited

U.S. PATENT DOCUMENTS

| | | | | |
|---|---|---|---|---|
| 6,006,266 A | * | 12/1999 | Murphy, Jr. | H04L 29/06 709/203 |
| 7,519,653 B1 | * | 4/2009 | Coutts | G06Q 20/00 235/381 |
| 7,739,590 B2 | * | 6/2010 | Stocker | G06F 17/30867 715/234 |
| 8,209,430 B2 | * | 6/2012 | Barreto | H04L 49/90 370/235 |
| 8,429,736 B2 | * | 4/2013 | Green | H04L 63/029 707/828 |
| 8,479,263 B1 | * | 7/2013 | Liu | H04L 63/0869 726/3 |
| 8,972,558 B1 | * | 3/2015 | Horton | G06F 9/542 709/203 |
| 9,324,098 B1 | * | 4/2016 | Agrawal | G06Q 30/04 |

(Continued)

*Primary Examiner* — Alina A Boutah
(74) *Attorney, Agent, or Firm* — Alston & Bird LLP

(57) ABSTRACT

Provided are a method and an apparatus for implementing communication from a web page to a client. The method includes: a browser establishing a communication connection with a port when accessing a web page, where the port is a port predefined to communicate with the web page; and sending link information carrying parameters specified by a preset communication protocol to the port, so that the client accesses a client page corresponding to the link information, where the parameters include fields in a service requirement and client page information. A client can be directly called from a web page of a portal web site, so as to guide a user to complete a required service to a designated page, thereby being convenient for the user to operate.

15 Claims, 6 Drawing Sheets

(56) References Cited

U.S. PATENT DOCUMENTS

| | | | | |
|---|---|---|---|---|
| 9,582,817 B2* | 2/2017 | Keithley | | G06F 17/30867 |
| 2005/0021858 A1* | 1/2005 | Ruston | | G06F 17/30887 |
| | | | | 709/246 |
| 2005/0198332 A1* | 9/2005 | Laertz | | H04L 63/0281 |
| | | | | 709/229 |
| 2006/0092861 A1* | 5/2006 | Corday | | H04L 41/0213 |
| | | | | 370/256 |
| 2006/0195687 A1* | 8/2006 | Klein | | H04L 63/0428 |
| | | | | 713/150 |
| 2007/0174191 A1* | 7/2007 | Keaton | | G06Q 20/10 |
| | | | | 705/40 |
| 2007/0198524 A1* | 8/2007 | Branda | | H04L 67/1034 |
| 2011/0035319 A1* | 2/2011 | Brand | | G06Q 20/10 |
| | | | | 705/44 |
| 2011/0166922 A1* | 7/2011 | Fuerstenberg | | G06Q 30/02 |
| | | | | 705/14.39 |
| 2011/0307490 A1* | 12/2011 | Chow | | G06F 17/30867 |
| | | | | 707/741 |
| 2012/0116925 A1* | 5/2012 | Jamkhedkar | | G06Q 30/00 |
| | | | | 705/27.1 |
| 2012/0131228 A1* | 5/2012 | Kim | | G06F 9/445 |
| | | | | 710/5 |
| 2012/0210011 A1* | 8/2012 | Liu | | H04L 63/10 |
| | | | | 709/229 |
| 2013/0132491 A1* | 5/2013 | Watanabe | | G06Q 10/107 |
| | | | | 709/206 |
| 2013/0275492 A1* | 10/2013 | Kaufman | | H04L 63/029 |
| | | | | 709/203 |
| 2013/0290475 A1* | 10/2013 | Flagg | | H04L 67/18 |
| | | | | 709/217 |
| 2014/0025726 A1* | 1/2014 | Chen | | G06F 9/54 |
| | | | | 709/203 |
| 2014/0122733 A1* | 5/2014 | Kadota | | G06F 21/608 |
| | | | | 709/228 |
| 2015/0188979 A1* | 7/2015 | Almeras | | H04L 67/02 |
| | | | | 709/217 |
| 2015/0271294 A1* | 9/2015 | Ma | | H04W 12/08 |
| | | | | 709/203 |
| 2015/0295885 A1* | 10/2015 | Congdon | | H04L 61/2557 |
| | | | | 370/392 |
| 2015/0339661 A1* | 11/2015 | Li | | G06Q 20/351 |
| | | | | 705/41 |
| 2015/0358334 A1* | 12/2015 | Lantz | | G06F 8/65 |
| | | | | 726/3 |
| 2016/0100025 A1* | 4/2016 | Ebner | | H04L 67/2819 |
| | | | | 709/203 |
| 2016/0225059 A1* | 8/2016 | Chow | | G06Q 30/0625 |

* cited by examiner

METHOD AND APPARATUS FOR IMPLEMENTING COMMUNICATION FROM WEB PAGE TO CLIENT

CROSS-REFERENCE TO RELATED APPLICATION

This application claims priority to and the benefit of Chinese Patent Application Serial No. 201410857756.8, filed with the State Intellectual Property Office of P.R. China on Dec. 31, 2014, the content of which is incorporated herein by reference in its entirety.

TECHNICAL FIELD

The present invention relates to the field of Internet communication technologies, and in particular, to a method and an apparatus for implementing communication from a web page to a client.

BACKGROUND

As the network era develops, user applications based on the Internet, such as network games, network shopping and network videos are increasingly broad. Generally, network games, network videos and the like all have their corresponding portal web sites on the Internet, and a user needs to install a corresponding client locally to access a portal web site to implement various interaction operations.

In the prior art, in a case that a client has been installed locally and is not installed for the first time, when it intends to implement some services provided by a portal web site, the local client is started to access a home page of the corresponding web site, and the user voluntarily finds an entry of a designated page. In a case that no client is installed, a corresponding service provided on the portal web site may not be implemented. For example, when a network game client is activated from a portal page embedded in Alipay to receive a red envelope, an ideal implementation manner is jumping directly from Alipay to a corresponding page (not the home page) provided by the network game client for receiving the red envelope. However, the prior art obviously cannot implement this operation. Therefore, the complexity of operation of the user is increased.

BRIEF SUMMARY

A major technical problem solved by the present invention is to provide a method and an apparatus for implementing communication from a web page to a client, so that an interaction bridge is established between a portal web site and a client, thereby implementing direct calling of the client from a web page of the portal web site, and guiding a user to complete a required service to a designated page, thereby being convenient for the user to operate.

The present invention has the following beneficial effects: the present invention provides a method and an apparatus for implementing communication from a web page to a client, when a communication connection is established between a web page accessed by a browser and a predefined port, link information carrying parameters specified by a preset communication protocol is sent to the port, so that the client can access a client page corresponding to the link information; therefore, a connection between the web page and the client is established, thereby implementing direct communication from the web page to the client for interaction and service processing, and facilitating the operation of the user.

One aspect of the present invention provides a method for implementing communication from a web page to a client, comprising: establishing, by a browser, a communication connection with a port when accessing a web page, wherein the port is predefined to communicate with the web page; and transmitting to the port link information carrying parameters defined in implementation of a communication protocol, allowing user to access a client page on the client corresponding to the link information, wherein the parameters comprise fields in a service request and client page information.

These and other aspects of the invention are described further herein below.

DETAILED DESCRIPTION

The present invention is described in detail in the following through the accompanying drawings and implementation manners.

Figure 1:
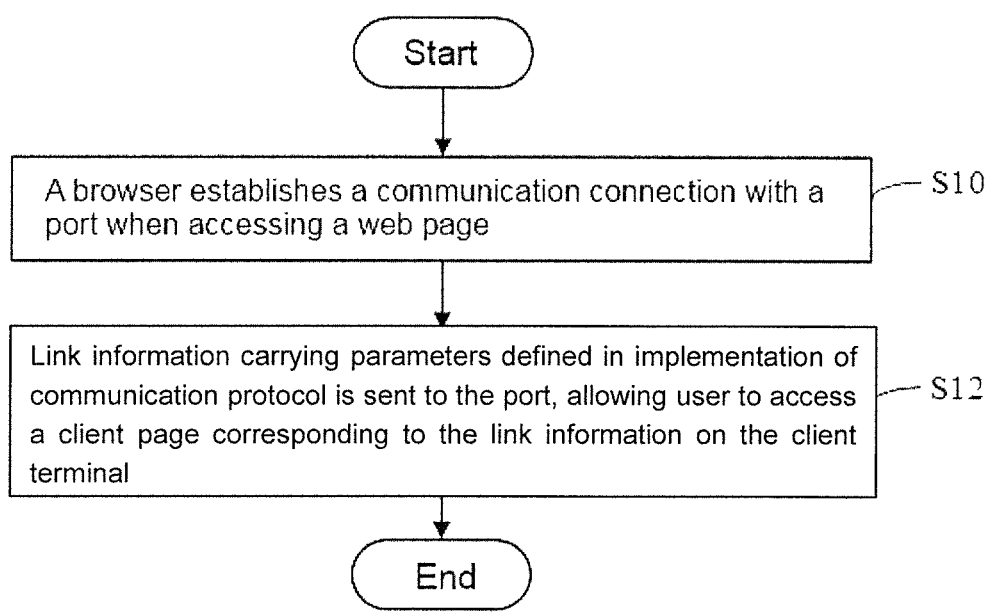
FIG. 1 is a flow chart of a method for implementing communication from a web page to a client according to one embodiment.

Referring to FIG. 1, a flow chart of a method for implementing communication from a web page to a client according to one embodiment is shown, and the method includes the following steps.

Step S10: A browser establishes a communication connection with a port when accessing a web page. The port is predefined to communicate with the web page.

Specifically, the browser sends a connection request to attempt to communicate with the predefined port, and when a communication connection can be established, it indicates that the client has been installed. When the client has been installed, a background process of the client monitors the port through socket, and when the connection request sent by the web page is received, a communication connection is established between the port and the web page.

Step S12: Link information carrying parameters defined in implementation of communication protocol is sent to the port, allowing a user to access a client page corresponding to the link information on the client terminal, which may also be referred to as an end client or a client end. The parameters include fields in a service request and page information on the client.

The web page accessed by the browser may be a portal web site, and multiple web page elements may be displayed on the web page, where some web page elements are set to associate with a service and a client that executes the service. When a selection to a web page element of at least one set service is received in a process of accessing the web page, a corresponding service request is generated, and at the same time, a client executing the service request is determined. The link information is a web page that may be accessed by the client when executing the service request.

In this embodiment, link information carrying parameters specified by a preset communication protocol is sent when communication between a web page accessed by a browser and an installed client is established, allowing the client to access a web page corresponding to the link information on the client terminal, thereby implementing direct communication between the web page and the client for interaction and service processing. Therefore, a connection between the web page and the client is established, thereby implementing direct communication from the web page to the client for interaction and service processing, and facilitating the operation of the user.

Figure 2:
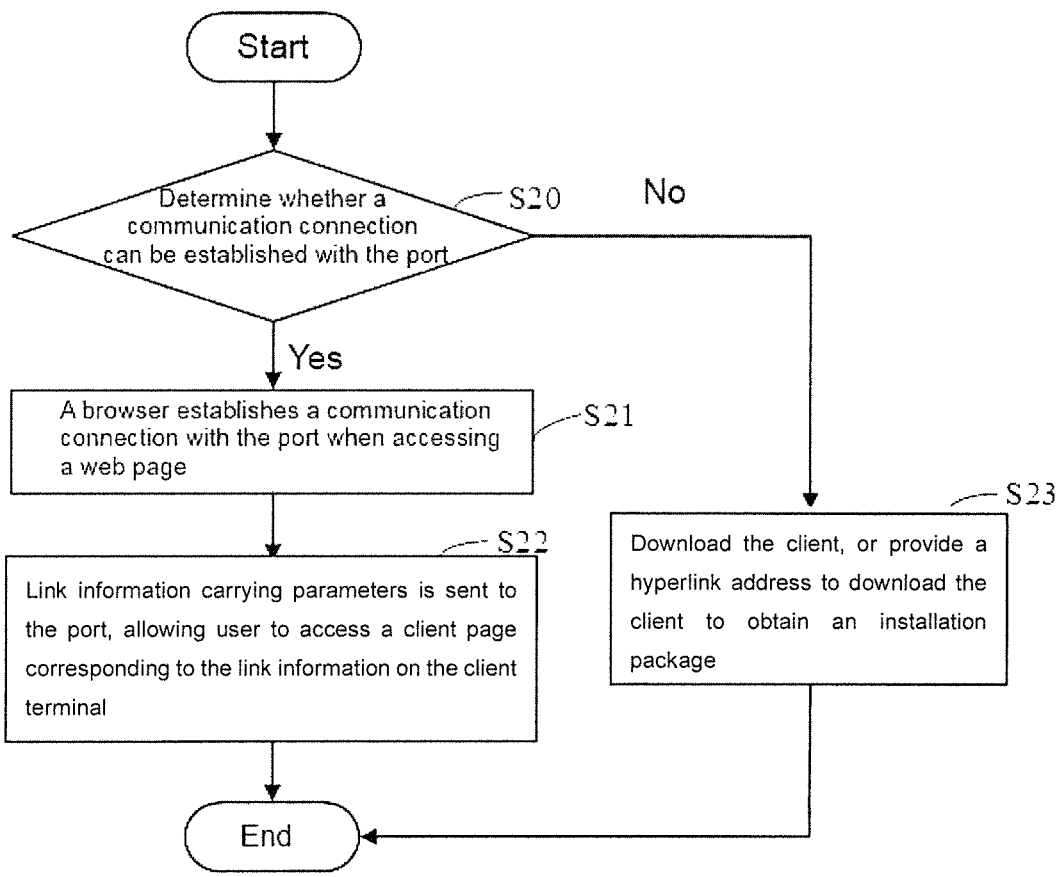
FIG. 2 is a flow chart of a method for implementing communication from a web page to a client according to one embodiment.

Referring to FIG. 2, a flow chart of a method for implementing communication from a web page to a client according to one embodiment is shown. The method includes the following steps.

Step S20: It is determined whether a communication connection can be established with a port. If yes, step S21 is performed; otherwise, step S23 is performed.

Step S21: A browser establishes a communication connection with the port when accessing a web page. The port is predefined to communicate with a web page.

Step S22: Link information carrying parameters specified by a preset communication protocol is sent to the port, allowing the client to access a web page corresponding to the link information on a client terminal. The parameters include fields in a service request and client page information. Then, the process ends.

Step S23: The client is downloaded, or a hyperlink address to download the client is provided to obtain an installation package of the client for installing the client, where a file name of the installation package includes the link information, allowing user to access the web page corresponding to the link information on the client terminal when being started for the first time. Then, the process ends.

Specifically, when the browser attempts to communicate with the predefined port, if a communication connection is established successfully, it indicates that the client has been installed; and if a communication connection is not established, it indicates that the client is not installed.

When the client is not installed, the browser may provide the hyperlink download address of the client to prompt the user to download. When the client is installed and started for the first time, file name information of the installation package is acquired by scanning download folder in sdcard, so as to acquire corresponding link information, and therefore, the client may directly access a web page corresponding to the link information after being started on the client terminal.

Figure 3:
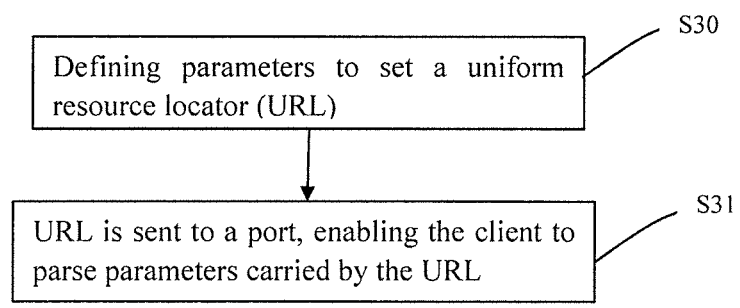
FIG. 3 is a flow chart of a method for sending link information in a method for implementing communication from a web page to a client according to one embodiment.

Referring to step S22 of FIG. 3, namely, the step of sending the link information carrying the parameters specified by the preset communication protocol to the port, so that the client accesses the web page corresponding to the link information on the client terminal is implemented specifically through the following steps:

Step S30: The parameters are defined to set a uniform resource locator (URL) in implementation of the communication protocol, so as to obtain the link information.

The communication protocol defines parameter specifications. The URL carries the parameters defined by the communication protocol. The parameters include fields of the service request and client page information.

Further, the communication protocol includes a URL protocol and a file name protocol, and the communication protocol defines protocol versions, service sets, operation methods, parameter sets and check bits of the URL protocol and the file name protocol. Specifically, specifications of service request defined by the communication protocol are shown as follows:

| | Protocol Version | Service Set | Operation Method | Parameter Set | Check Bit |
|---|---|---|---|---|---|
| Formation | g + version number | b + serial number | m + serial number | p + any character | 4-bit MD5 value |
| Length | 2 | 3 | 3 | No more than 200 | 4 |
| Example | g1 | b11 | m11 | p520530_cc134b8 | 1234 |

The protocol fields g, b, m, p and the like are case-insensitive, and MD5 is case-insensitive.

g—gamemanager represents a version;
b—business represents a service name;
m—method represents an operation method;
p—parameters represents parameters;
hash represents a check character string; and
the serial numbers in the communication protocol take a number in range of 10-99, so that almost ten thousand means of operations obtained by multiplying the service set by the operation method may be acquired, and therefore, it is applicable for the web page accessed by the browser to call the client to execute various services. For example, b12 represents a game type service, b14 represents a gift bag type service, m12 represents a concern operation, and b12m12 and b14m12 respectively represent concerning a game and concerning a game gift bag.

A parameter stitching rule in the parameter set may use sequential stitching using underline, or use other stitching manners, which is determined by a specific interface, and is not specified uniformly, to avoid inadaptability when parsing and stitching special parameters. When there is no parameter, the parameter set is p.

The manner of generating the check bits is: performing MD5 on the whole string, and the first 4 bits are used. When the client performs check, the last four bits of the protocol string are used.

The communication protocol first simply uses the check bits to check the whole message string, and if the check is not passed, the subsequent operation of calling the client will not be executed, so as to avoid program abnormality due to tampering of some fields. After the file name is scanned into the program and the check is not passed, the home page is directly opened.

A URL example: http://127.0.0.1:9998?hfp=g1b12m11p527432ba98;

A file name example: ninegame_g1b12m11p527432ba98.apk;

Note: b12m11 represents viewing the game, p527432 represents that a game Id is 527432, and ba98 is a four digit md5 check code.

The application of the check bits will be described in detail in the following.

Step S31: The URL is sent to a port, enabling the client to parse parameters carried by the URL according to the communication protocol and access the corresponding client page.

Figure 4:
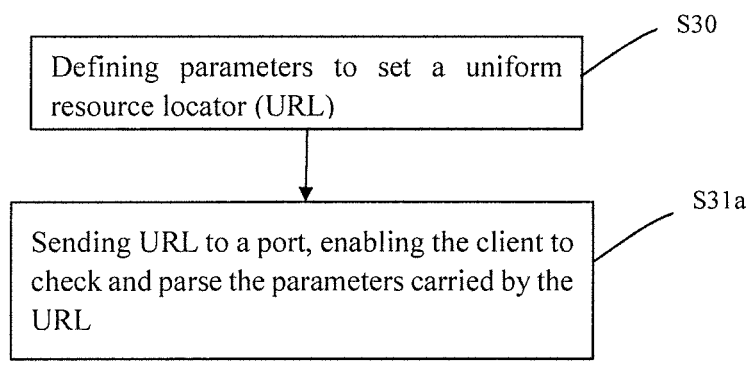
FIG. 4 is a flow chart of a method for sending link information in a method for implementing communication from a web page to a client according to one embodiment.

Referring to FIG. 4 at the same time, the step S31, that is, the step of sending the URL to a port, enabling the client to parse parameters carried by the URL according to the communication protocol and access the corresponding client page may specifically be implemented through the following steps:

Step S31*a*: The URL is sent to a port, enabling the client to check the parameters carried by the URL according to the check bits of the communication protocol and parse the parameters carried by the URL according to the communication protocol when the check is passed and access the client page.

For other steps in FIG. 4, please refer to FIG. 3 and corresponding text descriptions.

A method for implementing communication from a web page to a client is described through examples in the following.

In a process of accessing a web page, a browser receives a service request generated by operating the web page, where the accessed web page is an access page of a portal web site, and the service request is that a user of the client can receive a red envelope in a red envelope receiving activity provided by the portal web site. In this embodiment, the accessed web page attempts to communicate with a port 127.0.0.1:9988.

When a communication connection is established with the port, a URL is generated through implementation of the communication protocol as described above, for example, http://127.0.0.1:9998?hfp=g1b12m11p527432ba98, and the URL is sent to the port through the communication protocol, so that the client receives the URL.

The client performs check when receiving the URL, and if the check is passed, the URL parameters are parsed according to the communication protocol to acquire a web page corresponding to the activity and user information, to directly jump to a corresponding client page, for example, a red envelope receiving page, so as to fill the user information and guide the user to receive the red envelope, thereby executing the corresponding service request.

When a communication connection is not established with the port, it indicates that the client is not installed, and the client is downloaded or a hyperlink download address of the client is provided to prompt the user to download, where page information and user information corresponding to the red envelope activity are written in a file name of the installation package of the client according to the communication protocol. When the user installs the client and starts the client for the first time, a user download directory is scanned on the client terminal to acquire a file name of the installation package, and the file name is then parsed according to the communication protocol to obtain the page information corresponding to the red envelope activity and the user information. User is directed to the red envelope activity page according to the page information corresponding to the red envelope activity, fills the user information automatically, and guides the user to receive the red envelope.

In this way, direct calling from the web page of the red envelope activity page on the client is implemented, thereby implementing direct communication between the web page and the client. When the user does not install the client, the user may be prompted to download the installation package by providing a hyperlink of download, and after the user completes installation, the user is guided to the red envelope activity page.

Figure 5:
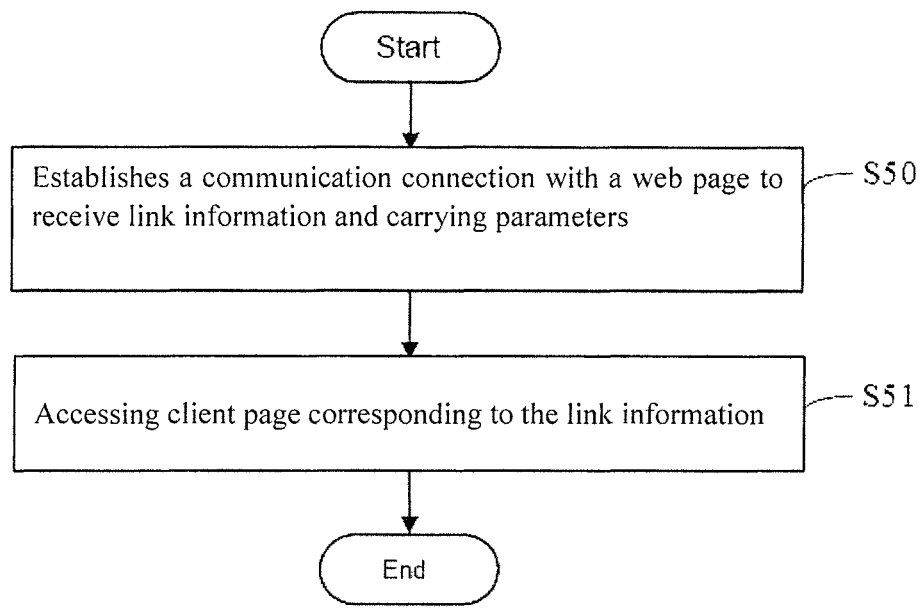
FIG. 5 is a flow chart of a method for implementing communication from a web page to a client according to one embodiment.

Referring to FIG. 5, a flow chart of a method for implementing communication from a web page to a client according to an embodiment is shown. The method includes:

Step S50: A client establishes, via a port, a communication connection with a web page accessed by a browser, so as to receive link information sent by the browser and carrying parameters defined in implementation of communication protocol. The port is predefined to communicate with a web page.

Further, the link information is a URL. The URL is set when the parameters are defined in implementation of the communication protocol by the browser. The URL carries the parameters defined by the communication protocol. The parameters include fields of the service request and web page information on the client terminal. The communication protocol includes a URL protocol and a file name protocol, and the communication protocol defines protocol versions, service sets, operation methods, parameter sets and check bits of the URL protocol and the file name protocol. The specific details may be obtained with reference to the related content in the foregoing, and are not repeated herein.

Specifically, when the client has been installed, the port is monitored on the client terminal through a socket, and when a connection request sent by the web page is received, a communication connection is established between the port and the web page, so as to receive link information sent by the browser.

Step S51: A client page corresponding to the link information is accessed.

Specifically, when the link information is a URL, parameters carried by the URL are parsed on the client terminal according to the communication protocol, allowing user to access the web page on the client terminal.

Further, the parameters carried by the URL are checked on the client terminal according to the communication protocol. The parameters are then parsed when the check is passed, allowing user to access the web page on client.

Figure 6:
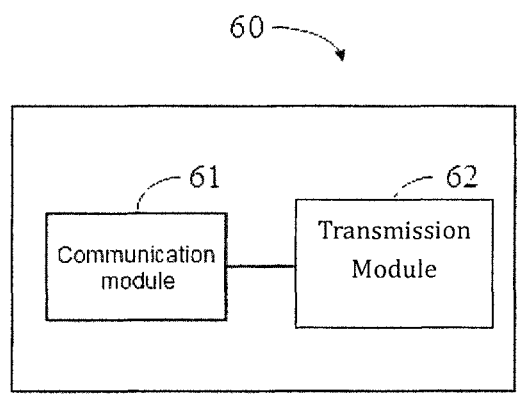
FIG. 6 is a schematic structural diagram of an apparatus for implementing communication from a web page to a client according to one embodiment.

Referring to FIG. 6, a schematic structural diagram of an apparatus 60 for implementing communication from a web page to a client according to one embodiment is shown. The apparatus 60 includes a communication module 61 and a transmission module 62.

The communication module 61 is configured to establish a communication connection with a port when accessing a web page. The port is predefined to communicate with the web page.

Specifically, the communication module 61 sends a connection request to attempt to communicate with the predefined port, and when a communication connection can be established, it indicates that the client has been installed. When the client has been installed, a background process of the client monitors the port through socket, and when the connection request sent by the web page is received, a communication connection is established between the port and the web page.

The transmission module 62 is configured to send to the port link information carrying parameters defined in implementation of a communication protocol, enabling the client to access a client page on the client terminal corresponding to the link information.

The accessed web page may be a portal web site, and multiple web page elements are displayed on the web page, where some web page elements are set to a corresponding service and a client executing the service. When a web page element of at least one set service is received in a process of accessing the web page, a corresponding service request is generated, and at the same time, a client executing the service request is determined. The link information is a web page that may be accessed by the client when executing the service request.

Figure 7:
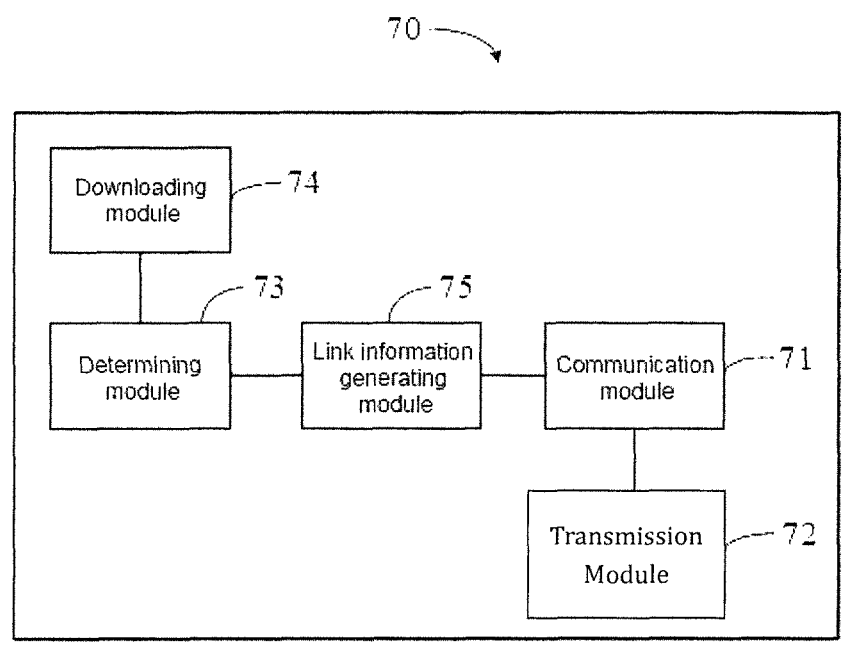
FIG. 7 is a schematic structural diagram of an apparatus for implementing communication from a web page to a client according to one embodiment.

Referring to FIG. 7, an apparatus 70 further includes a determining module 73 and a downloading module 74. The determining module 73 is configured to determine whether a communication connection can be established with the port. If yes, the communication module 71 establishes a communication connection with the port when accessing the web page. Otherwise, the downloading module 74 downloads the client, or provides a hyperlink download address of the client to obtain an installation package according to the hyperlink download address and install the client, where a file name of the installation package includes the link information, allowing the client to access the client page corresponding to the link information when being started for the first time.

Specifically, when the communication module 61 attempts to communicate with the predefined port, if the determining module 73 determines that a communication connection can be established, it indicates that the client has been installed. If the communication connection cannot be established, it indicates that the client is not installed.

When the client is not installed, the downloading module 74 provides the hyperlink download address of the client to prompt the user to download. When the client is installed and started for the first time, file name information of the installation package is acquired by scanning a download folder in an sdcard, so as to acquire corresponding link information, and therefore, the user can directly access a client page on the client terminal corresponding to the link information after being started.

Further, the apparatus 70 further includes a link information generating module 75, configured to define the parameters in implementation of the communication protocol and set a uniform resource locator (URL), so as to obtain the link information.

The communication protocol defines parameters. The URL carries the parameters defined in implementation of the communication protocol. The parameters include fields of the service request and client page information.

Further, the communication protocol includes a URL protocol and a file name protocol, and the communication protocol defines protocol versions, service sets, operation methods, parameter sets and check bits of the URL protocol and the file name protocol. Specifically, the service request defined by the communication protocol are as follows:

|  | Protocol Version | Service Set | Operation Method | Parameter Set | Check Bit |
| --- | --- | --- | --- | --- | --- |
| Formation | g + version number | b + serial number | m + serial number | p + any character | 4-bit MD5 value |
| Length | 2 | 3 | 3 | No more than 200 | 4 |
| Example | g1 | b11 | m11 | p520530_cc134b8 | 1234 |

The protocol fields g, b, m, p, and the like are case-insensitive, and MD5 is case-insensitive.

g—gamernanager represents a version;
b—business represents a service name;
m—method represents an operation method;
p—parameters represents parameters;
hash represents a check character string; and
the serial numbers in the communication protocol take a number in the range of 10-99.

The apparatus 70 further includes a transmission module 72. The transmission module 72 transmits the URL generated by the link information generating module 75 to the port, so that parameters carried by the URL are parsed on the client terminal according to the communication protocol, enabling user to access the client page on the client terminal.

For other modules in FIG. 7, refer to FIG. 6 and corresponding descriptions.

Figure 8:
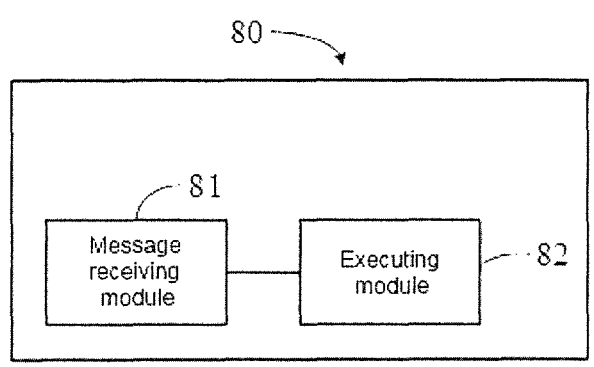
FIG. 8 is a schematic structural diagram of an apparatus for implementing communication from a web page to a client according to one embodiment.

Referring to FIG. 8, a schematic structural diagram of an apparatus 80 for implementing communication from a web page to a client according to the present invention is shown, and the apparatus 80 includes a message receiving module 81 and an executing module 82.

The message receiving module 81 is configured to receive link information sent by the browser and carrying parameters defined in implementation of communication protocol when establishing, via a port, a communication connection with a web page accessed by a browser. The port predefined to communicate with the web page.

Further, the link information is a URL. The URL is set when the parameters are defined in implementation of the communication protocol by the browser. The URL carries the parameters defined by the communication protocol. The parameters include fields of the service request and web page information on client terminal.

The executing module 82 is configured to access a client page corresponding to the link information.

When the link information corresponding to the service request is the URL, the executing module 82 parses parameters carried by the URL according to the communication protocol, so as to access the client page and execute the corresponding service request.

The communication protocol is used to define specifications of the service request. The URL carries the parameters defined by the communication protocol. The parameters include fields of the service request and client page information.

Further, the communication protocol includes a URL protocol and a file name protocol. The communication protocol defines protocol versions, service sets, operation methods, parameter sets and check bits of the URL protocol and the file name protocol.

Figure 9:
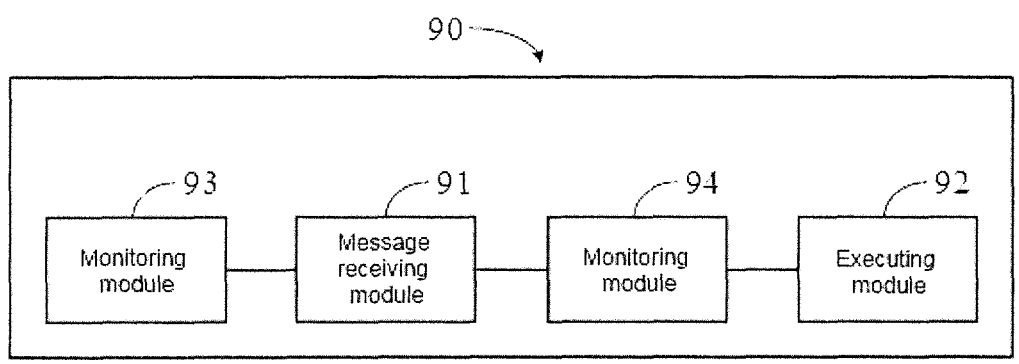
FIG. 9 is a schematic structural diagram of an apparatus for implementing communication from a web page to a client according to one embodiment.

Referring to FIG. 9, an apparatus 90 further includes a monitoring module 93. When the client has been installed, the monitoring module 93 is configured to monitor the port through a socket at a background process of the client, and when the message receiving module 91 receives the connection request sent by the web page, a communication connection is established between the port and the web page.

Further, the apparatus 90 further includes an executing module 92 and a checking module 94. When the link information is the URL, the checking module 94 checks, according to the communication protocol, the parameters carried by the URL received by the message receiving module 91. The executing module 92 parses the parameters carried by the URL according to the communication protocol when the check is passed, so as to access the client page.

For other modules in FIG. 9, refer to FIG. 8 and corresponding descriptions.

Embodiments of the present invention provide a method and an apparatus for implementing communication from a web page to a client, a communication connection is established between a web page accessed by a browser and a port predefined by the client terminal, and link information carrying parameters specified by a preset communication protocol is sent to the port, so that the client can access a client page corresponding to the link information. Therefore, a connection between the web page and the client is established, thereby implementing direct communication from the web page to the client for interaction and service processing, and facilitating the operation of the user.

The above descriptions are implementation manners of the present invention, and are not intended to limit the scope of the present invention. Any equivalent structure or equivalent flow variation made by using the description and accompanying drawings of the present invention and applied directly or indirectly in other related technical fields shall all fall within the protection scope of the present invention.

That which is claimed:

1. A method for implementing communication from a web page to a client application, comprising:
   accessing, by a browser of an apparatus, the web page;
   determining, by the browser, whether a communication connection can be established with a predefined port based on a response from the predefined port, wherein the response indicates whether the client application is installed on the apparatus;
   establishing, by the browser, the communication connection with the predefined port, wherein the predefined port is configured to communicate with the web page; and
   transmitting, by the browser, link information to the predefined port, wherein the link information comprises parameters specified by a preset communication protocol, wherein the parameters comprise fields in a service request and client page information, causing the client application to access a client page on the client application corresponding to the link information.

2. The method for implementing communication from the web page to the client application according to claim 1, wherein the predefined port is monitored by a background process of the client application through a socket.

3. The method for implementing communication from the web page to the client application according to claim 1, wherein before the step of the browser establishing the communication connection with the predefined port, the method further comprises:
   providing a download address of the client application to obtain an installation package of the client application according to the download address, wherein a file name of the installation package is generated based on the link information so that the client application accesses the client page corresponding to the link information when being started for the first time.

4. The method for implementing communication from the web page to the client application according to claim 1, wherein the step of transmitting the link information comprising the parameters specified by the preset communication protocol to the predefined port, comprises:
   defining the parameters based on the preset communication protocol and forming a uniform resource locator (URL), so as to obtain the link information; and
   sending the URL to the predefined port, so that the client application parses the parameters carried by the URL according to the preset communication protocol, to access the corresponding client page.

5. The method for implementing communication from the web page to the client application according to claim 2, wherein the step of transmitting the link information comprising the parameters specified by the preset communication protocol to the predefined port comprises:
   defining the parameters based on the preset communication protocol and forming a uniform resource locator (URL), so as to obtain the link information; and
   sending the URL to the predefined port, so that the client application parses the parameters carried by the URL according to the preset communication protocol, to access the corresponding client page.

6. The method for implementing communication from the web page to the client application according to claim 3, wherein the step of transmitting the link information comprising the parameters specified by the preset communication protocol to the predefined port comprises:
   defining the parameters based on the preset communication protocol and forming a uniform resource locator (URL), so as to obtain the link information; and
   sending the URL to the predefined port, so that the client application parses the parameters carried by the URL according to the preset communication protocol, to access the corresponding client page.

7. The method for implementing communication from the web page to the client application according to claim 4, wherein the preset communication protocol comprises a URL protocol and a file name protocol.

8. The method for implementing communication from the web page to the client application according to claim 7, wherein the preset communication protocol comprises protocol versions, service sets, operation methods, parameter sets, and check bits of the URL protocol and the file name protocol.

9. The method for implementing communication from the web page to the client application according to claim 8, wherein the step of sending the URL to the predefined port, so that the client application parses the parameters carried by the URL according to the preset communication protocol, to access the corresponding client page comprises:
   sending the URL to the predefined port, so that the client application checks the parameters carried by the URL according to the check bits of the preset communication protocol, and parses the parameters carried by the URL according to the preset communication protocol when the check is passed, to access the corresponding client page.

10. An apparatus for implementing communication from a web page to a client application, comprising:
    a determining module in communication with a predefined port, configured to determine whether a communication connection can be established with the predefined port based on a response from the predefined port, the response indicating whether the client application is installed;
    a communication module in communication with the predefined port and the determining module, configured to establish the communication connection with the predefined port when accessing the web page, wherein the predefined port is configured to communicate with the web page; and
    a sending module in communication with the communication module, configured to send link information to the predefined port, wherein the link information comprises parameters specified by a preset communication protocol, so that the client application accesses a client page on the client application corresponding to the link information.

11. The apparatus for implementing communication from the web page to the client application according to claim 10, further comprising a link information generating module in communication with the sending module, configured to define the parameters based on the preset communication protocol and form a URL, so as to obtain the link information; and the sending module is further configured to send the URL generated by the link information generating module to the predefined port, so that the client application parses the parameters carried by the URL according to the preset communication protocol, to access the corresponding client page.

12. A method for implementing communication from a web page to a client application on an apparatus, comprising:

establishing, by the client application and via a predefined port, a communication connection with the web page accessed by a browser on the apparatus, wherein a response from the predefined port to the browser indicates whether the client application is installed on the apparatus;

receiving, by the client application, link information sent by the browser and comprises parameters specified by a preset communication protocol, wherein the predefined port is configured to communicate with the web page; and accessing a client page on the client application corresponding to the link information.

13. The method for implementing communication from the web page to the client application according to claim 12, wherein before establishing, the communication connection with the web page accessed by the browser, so as to receive the link information sent by the browser and comprises the parameters specified by the preset communication protocol further comprises:

monitoring the predefined port by a background process of the client application through socket.

14. An apparatus for implementing communication from a web page to a client application, comprising:

a message receiving module in communication with the web page, configured to establish, via a predefined port, a communication connection with the web page accessed by a browser on the apparatus, and receive link information sent by the browser and comprises parameters specified by a preset communication protocol, wherein the predefined port is configured to communicate with the web page, wherein a response from the predefined port to the browser indicates whether the client application is installed on the apparatus; and an executing module in communication with the message receiving module, configured to access a client page on the client application corresponding to the link information.

15. The apparatus for implementing communication from the web page to the client application according to claim 14, wherein the apparatus further comprises a monitoring module connected to the message receiving module, configured to monitor the predefined port in a background process of the client application through a socket.

* * * * *